INVENTOR
THOMAS P. HOWARD

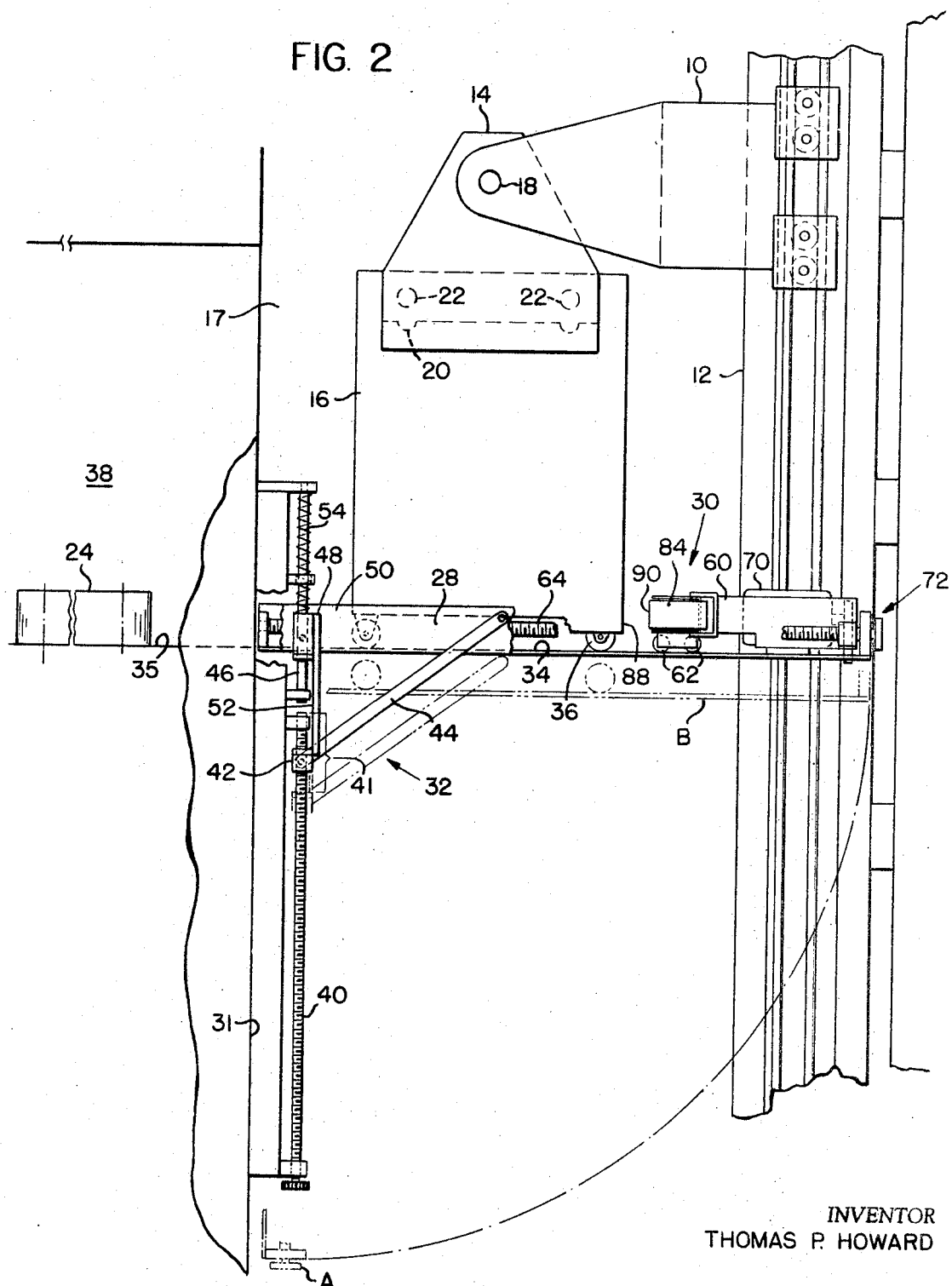

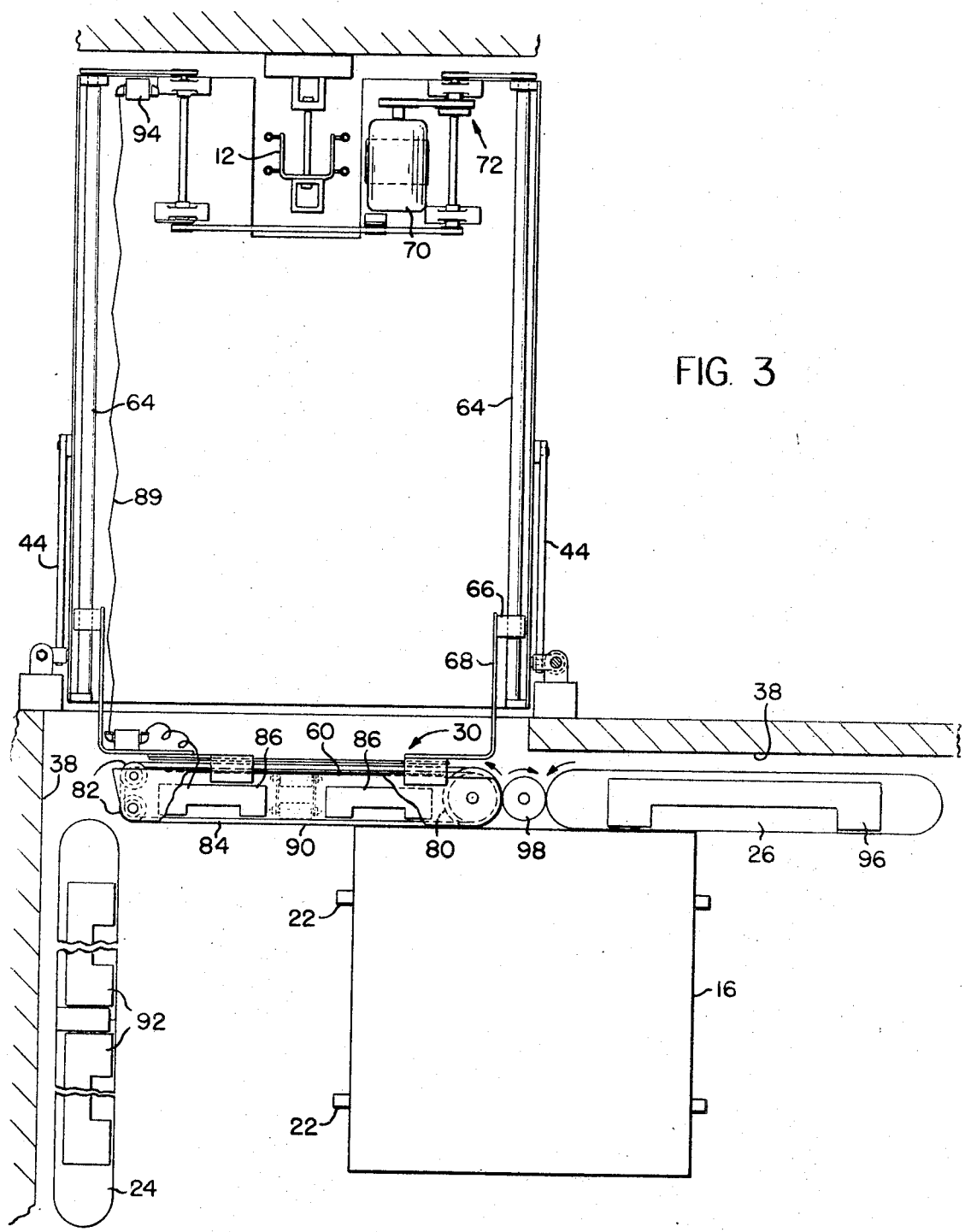

United States Patent Office 3,521,778
Patented July 28, 1970

3,521,778
VEHICLE WITH EXTERNAL LOADING AND UNLOADING MEANS
Thomas P. Howard, Ashland, Mass., assignor, by mesne assignments, to Sybron Corporation, Rochester, N.Y., a corporation of New York
Filed July 22, 1968, Ser. No. 746,409
Int. Cl. B65g 47/00
U.S. Cl. 214—624                   8 Claims

ABSTRACT OF THE DISCLOSURE

Apparatus for loading or unloading wheeled containers from a monorail guided, self-propelled transporter includes: a platform, pivoted adjacent the monorail track for unnesting containers from the transporter and supporting the containers at floor levels; a shuttle for engaging and ejecting containers from the platform and onto the floor, the driving face of the shuttle being a conveyor which includes an endless belt running over magnets for attraction and holding containers against the belt to eject containers laterally away from the shuttle; and a wall mounted receiving conveyor also comprising an endless belt running over magnets for moving ejected containers to a point removed from the shuttle.

BACKGROUND OF THE INVENTION

The present invention relates to a materials handling system and more particularly to a materials handling system of the overhead railway type in which a container is automatically loaded or unloaded from a container transport vehicle riding on the overhead trackway.

Overhead trackways and particularly monorails are widely used in factories, stores and offices to transport goods and materials from one station to another. In such systems it is common practice to mount the monorail from an overhead support so that the transporter will normally ride in a horizontal orientation. Certain monorail systems, however, are capable of traversing a vertical section of track for purposes of conveying material from one level to another. In this case, vertical track sections are mounted in a shaftway with horizontal track sections being located either at the basement level or on the roof of the building. Stop stations or load and unload stations are then provided at each level to permit access to the transport vehicle riding in the shaftway.

Heretofore, one common method of loading or unloading materials carried by such a transport vehicle was to have the vehicles programmed to stop automatically at a desired stop station. The shaftway door at this station would open to provide access to the container carried by the transport vehicle and a door on the container then opened to permit manual loading or unloading of material from the cotnainer. After loading or unloading first the container door and then the shaftway door was closed and the transport vehicle programmed for its next destination.

There are several drawbacks in this method of operation, for example, the operation of manually unloading materials from the container is time consuming and if an operator were not present to immediately begin the loading or unloading when the transport vehicle arrived, the stopped vehicle would block the trackway and prevent the passage of another transport vehicle programmed for the same or another destination, thereby further delaying the operation of the system.

Furthermore, if the final destination of the transported material was not convenient to a stop station, the operator had to unload the material from the container and onto a dolly, cart or other such device in order to convey the material to its final destination where the material was again unloaded. This double handling added to the inefficiency and cost of materials handling.

Thus, in the materials handling system of the type described, it is highly desirable to eliminate as much of the manual handling of the material as possible and to have the material loaded or unloaded from the transport vehicle automatically and as soon as the vehicle arrives at its programmed destination. Also, since the floor space immediately in front of the shaftway opening must not be blocked, it is highly desirable to provide an automatic system which will move the unloaded materials away from the space immediately in front of the shaftway opening as soon as possible so that other material can be moved into and out of the opening. In this respect, the system of the present invention also includes a conveyor for receiving and moving the unloaded materials to some point remote from the shaftway opening.

Heretofore, conveyors of the endless belt type for moving relatively heavy materials were provided with closely spaced idle rollers journaled to a rigid frame, the rollers acting to support the great weight of the material and the motion of the endless belt providing the means to transport the material. This type of conveyor has several drawbacks in that the construction requires considerable maintenance and is not adatped to clean locations such as a hospital, since the rollers, journals and frame are difficult to clean and provide a location for the accumulation of contaminants.

Further, the endless belt of such conveyors travelled in the plane generally parallel to or in the floor surface thereby making that portion of the floor area unusable for other purposes. This made such conveyors unsuited for locations having a limited floor area, such as a narrow passageway or corridor.

Other types of continuous conveyors, such as an endless chain have been developed which do not support the material being moved, but merely supply the motor power to pull an article or a container of material along the floor surface. Such conveyors can be installed in a minimum of space, but require dogs or other latching devices to attach the articles or containers to the endless chain. These dogs or latching devices are awkward to operate, especially if the chain is moving. These conveyor systems in addition require extensive maintenance and provide many inexcessible areas where contaminants may accumulate. Moreover, where such chain type conveyors are mounted in and travel through a narrow slot in the floor surface, there is considerable danger of objects falling into the slot and either jamming or damaging the apparatus. For these reasons, such a conveyor is totally unacceptable for hospital use.

SUMMARY OF THE INVENTION

The materials handling system of the present invention is characterized in one aspect thereof by the provision of a movable platform located adjacent to each stop station and normally disposed in a stored position out of the path of travel of the container transport vehicle. When a transport vehicle with a container attached has stopped adjacent the stop station, the platform is first moved to a position beneath the container and is then elevated to detach the container from its transport vehicle and support the container at the level of the stop station. A shuttle carried by the platform then ejects the container by pushing the container from the platform and onto the stop station floor. The pushing face of the shuttle is an endless belt which runs across magnets so that the container, held against the belt by the magnets, can be moved laterally away from the stop station after the shuttle has first pushed the container onto the station floor. A wall mounted receiving conveyor comprising an endless belt travelling in the plane parallel to or in a wall surface and also running across magnets is adapted to receive the container from the shuttle for purposes of moving the container farther away from the stop station, the container being wheeled or otherwise self-supported so that the receiving and shuttle conveyors do not support the weight of the container, but merely supply the means for propelling the container. The wall mounted receiving conveyor, shuttle conveyor, shuttle and platform are all adapted to operate in reverse for purposes of moving a container to the station from a remote point such as a storage area and loading the container onto a transport vehicle.

OBJECTS OF THE INVENTION

It is an object of the present invention to provide a materials handling system wherein a container is automatically loaded or unloaded when a vehicle transporting the container arrives at a programmed destination.

Another object of the invention is to provide a materials handling system wherein a container is releasably attached to a transport vehicle so that the container itself can be loaded or unloaded from the vehicle.

Still another object of the invention is to provide an automatic materials handling system suitable for use in hospitals or other clean environments.

A further object of the present invention is to provide a materials handling system in which containers transported through a shaftway are automatically ejected from the shaftway and moved away from the shaftway entrance.

A still further object of the invention is to provide a materials handling system which can automatically load a container onto a transporting vehicle once the container has been positioned adjacent a vehicle stopping point and the transport vehicle called for.

Yet another object of the present invention is to provide a materials handling system including an endless belt conveyor for transporting relatively wide heavy articles along a floor surface, the conveyor being unable to support the weight of the article and occupying a minimum of floor space.

Another object of the present invention is to provide a materials handling system for moving mobile containers, the system including a conveyor which has the endless belt thereof travelling in a plane parallel to or in a wall surface and over magnets, the magnets attracting and holding the mobile containers against the belt.

Still another object of the present invention is to provide a materials handling system having a wall mounted conveyor belt adapted to move mobile containers along a floor surface towards or away from a shaftway opening for purposes of loading or unloading containers from a vehicle travelling in the shaftway.

These and other objects, advantages and characterizing features of my invention will become more apparent upon consideration of the following detailed description thereof when taken in conjunction with the accompanying drawings depicting the same.

DESCRIPTION OF THE DRAWING

FIG. 2 is an elevation view of the shaftway showing the container eject mechanism, the stored and horizontal positions of the eject platform being represented in phantom line and the operational position of the platform being represented in solid line; and FIG. 3 is a plan view of a stop station with the transporter removed for clarity showing a container being moved between the shuttle conveyor and a wall mounted station conveyor.

DESCRIPTION OF THE PREFERRED EMBODIMENTS

Figure 1:
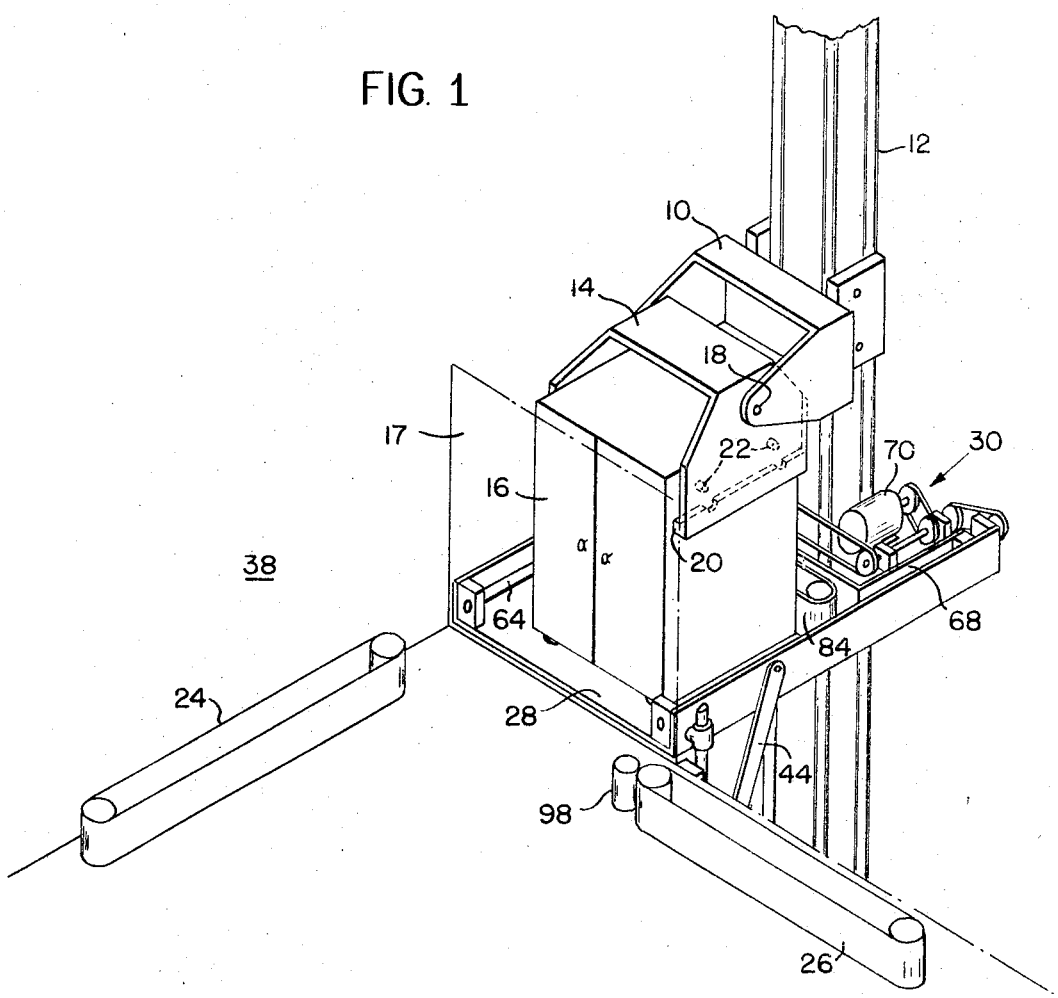
FIG. 1 is a prospective view of a typical stop station showing a monorail transporter, a platform supporting a container at station level, and the wall mounted station conveyors.

Referring to the drawings, FIG. 1 shows the material handling system of the present invention to include a monorail-supported self-propelled vehicle or container transporter 10, which is capable of travelling along its support rail 12 through both vertical and horizontal courses of travel by drawing electrical power from bus bars (not shown) associated with the rail. Support rail 12 is preferably mounted in a shaftway during vertical courses of travel, as for example, from one floor of a building to another. Transporters 10 are known in the art and it is sufficient for purposes of the present invention to state merely that the transporter is rail guided, can travel under its own power along vertical and horizontal sections of the guide rail, and is capable of accepting a program enabling the transporter to stop at a preset destination.

The transport vehicle also includes a yoke 14 which is pivoted to the vehicle at 18. Yoke 14 is adapted to releasably carry a wheeled container 16 and is pivoted to the transporter so that both the yoke and container will always be in a vertically oriented position regardless of the inclination of the transporter. This is important in order to prevent spillage of liquids from open containers or shifting of the load carried in the container. The yoke includes a nest member 20 which is adapted to receive corresponding nesting members 22 fixed to the side wall of container 16. With this arrangement the container can be detached from the yoke member by moving the container relative to the yoke so as to permit nesting members 22 to clear their respective nests 20.

As stated hereinabove, trackway 12 is preferably mounted in a shaftway in its vertical course of travel with horizontal sections of the track being installed at the basement and/or roof levels and connected with the vertical sections to form a closed loop system. With this arrangement the possibility of head on collisions is eliminated by having all transporters travel throughout the closed loop system in the same direction. With the rail located within a vertical shaftway, it is apparent that the system can be made to service each floor level by having a stop station on each floor adjacent the shaftway, and a typical stop station is shown in FIG. 1. It should be understood that in the present system each stop station has its own code designation so that a transport vehicle will seek out and stop adjacent only that stop station for which the vehicle has been programmed. Once the transport vehicle has arrived at the desired stop station the apparatus located at this stop station will then load or unload a container from the yoke automatically. It should also be understood that while FIG. 1 shows a vertical stop station the same or similar apparatus shown can also be used to load or unload containers at stations along a horizontal section of track.

As shown in FIG. 1 this apparatus includes a conveyor 24 for moving the containers in a direction directly into or out of the shaftway opening 17, a conveyor 26 for moving the containers laterally away from or toward the shaftway opening, a movable platform 28 for unnesting and supporting the container at the stop station floor level and a shuttle assembly generally indicated at 30 carried by the platform for pushing a container from the platform onto the station floor or pulling a container from the stop station floor onto the platform.

Platform 28 normally is in a stored position out of the path of travel of transport vehicle 10 so as not to obstruct the free passage of vehicles in the shaftway by the stop station, as for example, when transporter vehicles are programmed for other destinations. The platform is moved into the transporter vehicle path of travel, as shown in FIG. 1, only after a vehicle has arrived and stopped adjacent the stop station and the platform is moved back to its stored position before the transport vehicle is again on its way.

One embodiment of the present invention, wherein the platform is stored in a vertical position flush against the shaftway wall, pivoted to a horizontal position and then lifted vertically to the level of the stop station, is shown in FIG. 2. In the embodiment shown in FIG. 2, phantom line A shows platform 28 stored in a vertical position adjacent wall 31 of the shaftway and below the shaftway opening 17. A platform lifting device generally indicated at 32 first pivots platform 28 from a vertically stored position to a horizontal position (shown by phantom line B) and then lifts the platform vertically to a position (shown in solid line) where the pan surface 34 of the platform is level with the floor or stationary platform 35 of the stop station. Then, depending upon whether a container is to be loaded or unloaded from transport vehicle, shuttle 30 either pulls wheeled container 16 from floor 35 and onto the pan surface of platform 28 or pushes the container from the pan surface and onto the station floor.

As shown in FIG. 2, the platform lifting device 32 includes a lead screw 40 supported in a vertical position by the sidewall 31 of the shaftway. A slave nut 42 riding on the lead screw is connected to one end of a link 44 which has its other end pivotally attached to platform 28. A guide rod 46, also supported by shaftway wall 31, slidably carries a sleeve 48, which pivotally supports one end 50 of platform 28. The sleeve carries a push rod 52 which extends downwardly over the upper portion 41 of the lead screw 40 so as to contact nut 42 when the nut reaches this portion of the lead screw. A spring bias 54 urges the sleeve towards the lead screw for purposes set forth hereinbelow.

If the platform is in the stored position lying flush against the shaftway wall, it can be pivoted to the horizontal position, as shown in phantom line B, and lifted to the level of the stop station floor, as shown in solid line, by any suitable motor means (not shown) which is activated to turn the lead screw so as to drive slave nut 42 upwardly. In this respect, as the nut travels upwardly on the lead screw, the nut acts on platform 28 through linkage 44 so as to pivot the platform about its end 50 to a horizontal position. The action of spring 54 on sleeve 48 resists any vertical movement of the sleeve and platform end 50 to keep the platform below the level of the stop station floor while the platform is being pivoted to a horizontal position. When platform 28 is in the horizontal position shown in phantom line B, nut 42 will be in position to contact push rod 52 so that turning the lead screw will cause sleeve 48 to slide upwardly on guide rod 46 against the bias of spring 54. In this manner, nut 42 acting on one end 50 of platform 28 through push rod 52 and sleeve 48 and acting on the platform through link 44, can move the horizontally oriented platform up to the floor level 35 of the stop station as shown in solid line.

When the platform is at the stop station floor level, a container can be either pushed from the platform onto the station floor or pulled from the station floor onto the platform by shuttle 30. As shown in FIG. 2, the shuttle includes a frame 60 which rides on wheels 62. The frame is driven by a pair of lead screws 64 carried on each side of the platform, which act through nuts 66 (FIG. 3) and drive rods 68 to drive shuttle frame 60 either toward or away from track rail 12, depending upon the direction in which the lead screws are rotated. Any suitable means such as a reversible electric motor 70 driving through a belt and pulley arrangement generally indicated at 72 drives both lead screws in concert.

An idler pulley 80 (FIG. 3) journaled to one end of shuttle frame 60 and a pair of idle pulleys 82 journaled to the other end of the shuttle frame support an endless belt 84 which provides the pushing face 90 of the shuttle. Endless belt 84 also passes over a series of electro-magnets 86 carried by the shuttle frame, the magnets being adapted to attract and hold a metal skirt 88 of the container 16 against the pushing face 90 of belt 84 (FIG. 2) for purposes set out hereinbelow. A flexible cable 89 connecting the magnets to an electrical feed box 94, coils and uncoils as the shuttle is moved respectively toward and away from trackway 12 connects the magnets to an electrical source, not shown.

As shown in FIG. 3, stop station conveyors 24 and 26 are also endless belts running across magnets 92 and 96, respectively. The endless belt of each of the station conveyors lies normal to the floor surface so that the belt travels in the plane paralleled to and adjacent the wall surface 38. It should be appreciated that conveyors 24 and 26 occupy a minimum of floor space since they can be mounted either adjacent to the wall surface 38 as shown or in the wall surface so that only a small portion of the conveyor is exposed. By mounting the station conveyors adjacent floor level, magnets 92 or 96 can attract the metal skirt of the container to the endless belt for moving the wheeled container over the floor surface. Thus, the station conveyors, 24 and 26 do not support the full weight of the containers but merely supply the motor power to move the self supported mobile containers along floor surface. While magnets 92 and 96 may be either permanent magnets or electro-magnets, it is preferred that the magnets 92 in the embodiment shown be electro-magnets. In this respect, an electro-magnet can be de-energized to permit an operator to adjustably position a container against conveyor 24 in the correct orientation for moving the container towards and into the shaftway. While the stop station conveyors and shuttle conveyor can be driven by any suitable means, we have shown, for purposes of illustration, stop station conveyor 26 and shuttle conveyor 84 being driven by a roller member 98 located adjacent the shaftway opening 17.

To describe the method of operation of the invention and by way of illustration only, assume first that a transport vehicle 10, with container, is programmed to stop at some point adjacent shaftway opening 17 which locates the wheels of container 16 below the floor level 35 of the station. After the transport vehicle has stopped adjacent the shaftway opening, a signal is directed to any suitable motor means, not shown, which drives platform lifting device 32 (FIG. 2) for moving the platform from its stored position to the level of the stop station. In this respect, and as set out hereinabove, lead screw 40 is turned, moving platform 28 first to a horizontal position spaced below wheels 36 of container 16. Further turning of lead screw 40 then moves the horizontally oriented platform 28 up to the level of the stop station floor 35. The horizontally oriented platform in moving up to the level of the stop station floor engages the wheels of the container 16 so that the container is lifted with respect to transporter 10. This unnests the nestable members 22 from the nest 20 and releases the container from yoke 14 so that the platform supports the container with the wheels of the container being located at the level of the station floor. With the pan 34 of the platform located at the level of the station floor, motor 70 is energized to drive lead screws 64 and shuttle 30 for pushing the wheeled container from the platform onto the stop station floor.

As shown in FIG. 3, the endless belt 84 of shuttle 30 engages roller 98 after the container has been pushed onto the station floor. The contact between the conveyor and roller 98 drives conveyor belt 84 in a counterclockwise direction shown by the arrows in FIG. 3. With the metal skirt 88 of container 16 held against conveyor belt 84 by electro-magnets 86, the container is moved on its own wheels along the stop station floor to the left as viewed in FIG. 3, and is passed onto stop station conveyor 26. Magnets 96 attract and hold the metal skirt of the container against station conveyor 26 and roller 98 also drives the conveyor in a counterclockwise direction so that the container will continue to move to the left as viewed in FIG. 3 until the container either passes off conveyor 26 or the drive roller is stopped. In this manner, the container can be mover laterally away from the shaftway opening to an accumulate position removed from the shaftway opening where the container will remain until retrieved by the operator. If further containers arrive at the stop station while container 16 is in the accumulated position, these other containers will be merely ejected, removed from the shaftway opening and accumulated in the same manner. In this way, the shaftway entrance 17 is automatically maintained free from congestion and pile up due to the arrival of several containers in rapid succession.

When an operator desires to load a container onto a transporter, the container is simply pushed against the magnetic station conveyor 24 and a transport vehicle called for. Upon arrival of the empty transport vehicle, platform 28 is again raised to the level of the stop station floor and motor 70 energized to move shuttle 30 to its extended position as shown in FIG. 3. Conveyor 24 is energized and moves the container towards the shaftway opening until the container is carried against the push face of shuttle 30. The electro-magnetic carried by the shuttle then hold the metal skirt 88 of the container against the push face 90 of the shuttle so that reversal of the rotation of lead screws 64 will cause the shuttle to pull the container onto the platform 28. With the container in position on the platform, the platform is lowered to nest the nestable members 22 with the nest members 20 carried by the yoke and then pivoted to the position shown in phantom line A in FIG. 2 out of the path of travel of the transported vehicle. The transported vehicle with its attached container then proceeds to its destination where the container is unloaded in a manner set forth hereinabove.

Thus, it will be appreciated that the present invention accomplishes its intended objects in providing a materials handling system which can automatically eject a container from a transport vehicle and convey the container to a storage area or, in reverse, automatically move a container from a storage area to a transport vehicle and load the container onto the vehicle.

While a preferred embodiment of the invention has been described in detail, it should be apparent that various modifications can be made therein without changing the spirit and scope of the invention as set out in the appended claims. Furthermore, while the invention has been described in connection with a vertical stop station, should be apparent that the invention can also be used in connection with a horizontal stop station wherein the guide rail is horizontally disposed. In this case, it would be sufficient merely to store the platform below the path of container travel in a horizontal position and then simply elevate the platform up to the level of the station floor to load or unload containers. It is also within the skill of the art to locate the shuttle on the stop station floor rather than on the platform for pushing a container from the station floor to the platform or pulling a container from the platform onto the station floor.

Moreover, while conveyors 24 and 26 are shown located only at the stop station, it should be appreciated that one or both of these conveyors can extend for a considerable distance along any wall surface as for example, in a passageway or corridor in order to transfer containers to and from a position removed from the shaftway opening.

Having thus described the invention, what is claimed as new is:

1. A material handling system comprising in combination:
   (a) a rail supported vehicle adapted for movement between fixed stations;
   (b) a container releasably suspended from said vehicle;
   (c) a platform adjacent the path of travel of said container at each station for receiving said container;
   (d) a vertically movable container support located adjacent each station, said support including a vertically movable member pivotally supporting one end of said container support adjacent said platform, said support being movable between a first position depending from said member normally out of the path of travel of said container and below said platform, and a second position substantially at the level of and adjoining said platform;
   (e) means for pivoting said container support about said member to a substantially horizontal position and thereafter elevating said container support to said second position to facilitate substantially horizontal movement of said container from said support to said platform; and
   (f) a releasable coupling connecting said vehicle and container adapted to uncouple and release said container from said vehicle as said container is moved upwardly with respect to said vehicle.

2. The material handling system as set forth in claim 1 comprising:
   (a) bias means for preventing the vertical movement of said member as said container support is pivoted to said horizontal position; and
   (b) means for engaging said member when said container support is in said horizontal position to move said member and therefore said container support vertically against the influence of said bias means.

3. The material handling system as set forth in claim 1 further comprising:
   (a) a shuttle, activated when said container support is substantially at the level of and adjoining said platform for moving containers through a path of travel extending between said container support and said platform; and
   (b) means carried by said shuttle activated when said shuttle is adjacent said platform for moving containers in a direction generally normal to the path of travel of said shuttle.

4. The material handling system as set forth in claim 3 comprising:
   (a) a magnetic member on said container;
   (b) magnetic means on said shuttle for attracting said magnetic member and therefore said container; and
   (c) an endless belt conveyor carried by said shuttle and having the endless belt thereof lying generally normal to said platform, said endless belt having a portion disposed between said magnetic member and magnetic means to permit said magnetic means to attract said magnetic member and therefore said container against said endless belt, whereby said container is held against said endless belt for movement by said belt in a direction generally normal to the path of travel of said shuttle.

5. In a materials handling system including a vehicle adapted for traveling a programmed path from one stop station to another, a portion of said path of travel extending through a shaftway, means for removing containers transported by said vehicle from said vehicle through an opening in the wall of said shaftway and onto a platform at the stop station, said means comprising:
   (a) a container releasably suspended from said vehicle;
   (b) a movable container support disposed in said shaftway,
      (i) said container support having an end thereof pivotally supported by the wall of said shaftway, and
      (ii) said container support being normally disposed in a stored position and out of the path of travel of said vehicle through said shaftway;
   (c) means for moving said container support from said stored position to a position in said shaftway in the path of travel of said vehicle beneath said container;
   (d) means for moving said container support vertically up to the level of said opening, said vertically moving support first engaging then moving said container relative to said vehicle to effect the release of the same from said vehicle and then supporting said container at the level of said opening; and (e) ejector means carried by said container support for moving said container through said opening and onto said stop station platform.

6. The combination as set forth in claim 5 in which said container support is stored in a vertical position substantially flush against said shaftway wall and depending from said pivotally supported end, said first mentioned means comprising:

(a) a driven member movable through a substantially vertical path of travel adjacent the wall of said shaftway; and (b) a link having one end pivoted to said driven member and another end pivoted to said container support, the vertical movement of said driven member being transferred by said link to pivot said container support to a substantially horizontal position beneath said container.

7. The combination as set forth in claim 6 in which said second mentioned means comprises:

(a) a guide member fixed to the wall of said shaftway and extending substantially parallel to the path of travel of said driven member;

(b) a sleeve slidably carried by said guide member and pivotally supporting one end of said platform;

(c) means biasing said sleeve toward said driven member; and (d) a depending element fixed to said sleeve for engaging said driven member during a portion of its vertical path of travel to move said sleeve against said bias means whereby said horizontally positioned container support is moved vertically first to engage said container and thereafter to elevate said container support and container up to the level of said station platform.

8. The combination as set forth in claim 5 further including a container receiving means comprising:

(a) an endless belt conveyor at least partially on said station platform, the endless belt of said conveyor being disposed in a plane generally normal to said station platform; and (b) magnetic means for attracting and holding said container against said endless belt for moving said container along said station platform in a direction away from said opening.

References Cited

UNITED STATES PATENTS

| 2,711,832 | 6/1955 | Cigliano | 214—622 XR |
| 3,126,114 | 3/1964 | Nakahara | 214—624 |
| 3,337,069 | 8/1967 | Burger | 214—625 XR |

FOREIGN PATENTS

| 367,376 | 1/1923 | Germany. |
| 644,013 | 10/1935 | Germany. |

GERALD M. FORLENZA, Primary Examiner

R. B. JOHNSON, Assistant Examiner

U.S. Cl. X.R.

214—16.4